United States Patent
Cadena et al.

(10) Patent No.: US 7,802,834 B2
(45) Date of Patent: Sep. 28, 2010

(54) MULTIPLE SLIDE-OUT ROOM FOR A RECREATIONAL VEHICLE

(75) Inventors: Tomas D. Cadena, Riverside, CA (US); Jose J. Mercado, Rialto, CA (US)

(73) Assignee: Monaco Coach Corporation, Wilmington, DE (US)

(*) Notice: Subject to any disclaimer, the term of this patent is extended or adjusted under 35 U.S.C. 154(b) by 502 days.

(21) Appl. No.: 11/796,676

(22) Filed: Apr. 26, 2007

(65) Prior Publication Data

US 2008/0265618 A1    Oct. 30, 2008

(51) Int. Cl.
B60P 3/34 (2006.01)

(52) U.S. Cl. .................. 296/26.13; 296/165; 296/171; 296/175; 296/172

(58) Field of Classification Search ............... 296/156, 296/164, 165, 170, 171, 172, 173, 175, 176, 296/26.01, 26.08, 26.09, 26.12, 26.13; 52/67
See application file for complete search history.

(56) References Cited

U.S. PATENT DOCUMENTS

| | | | |
|---|---|---|---|
| 2,704,223 A | | 3/1955 | Houdart |
| 2,757,418 A | * | 8/1956 | Bergstrom ..................... 52/67 |
| 2,842,972 A | | 7/1958 | Houdart |
| 3,323,778 A | * | 6/1967 | Baker ..................... 296/26.05 |
| 3,797,880 A | | 3/1974 | Pezzaglia |
| 5,577,351 A | | 11/1996 | Dewald, Jr. et al. |
| 5,758,918 A | | 6/1998 | Schneider et al. |
| 5,791,715 A | * | 8/1998 | Nebel ..................... 296/26.13 |
| 5,902,001 A | | 5/1999 | Schneider |
| 6,052,952 A | | 4/2000 | Frerichs et al. |
| 6,067,756 A | | 5/2000 | Frerichs et al. |
| 6,454,336 B1 | | 9/2002 | Nye et al. |
| 6,619,713 B2 | | 9/2003 | Eichhorn |
| 6,658,798 B1 | | 12/2003 | Frerichs et al. |
| 6,871,897 B1 | | 3/2005 | Snyder |
| 6,976,721 B2 | | 12/2005 | Rasmussen |
| 7,052,064 B2 | * | 5/2006 | Rasmussen ............... 296/26.01 |
| 7,360,815 B2 | * | 4/2008 | Kunz et al. ............... 296/26.13 |
| 2005/0006924 A1 | * | 1/2005 | Rasmussen ................ 296/99.1 |
| 2005/0184546 A1 | | 8/2005 | Kunz et al. |
| 2006/0113822 A1 | | 6/2006 | Kunz |
| 2006/0125265 A1 | | 6/2006 | Kunz |
| 2006/0125266 A1 | | 6/2006 | Kunz |
| 2006/0125268 A1 | * | 6/2006 | Kunz ........................ 296/26.09 |

* cited by examiner

*Primary Examiner*—Patricia L Engle
(74) *Attorney, Agent, or Firm*—Baker & Daniels LLP (57) ABSTRACT

A multiple slide-out system for a recreational vehicle or the like includes a first slide-out section having a first floor, a first carriage abutting and affixed to the first floor, a first driven track affixed to the underside of the first carriage, and a first drive motor anchored to the floor of the vehicle to drive the first slide-out section relative to the vehicle. A second slide-out section which slides within the first slide-out section includes a second floor, a second carriage abutting and affixed to the second floor, a second driven track affixed to the underside of the second carriage, and a second drive motor anchored to top side of the first carriage to drive the second slide-out section relative to the first slide-out section. The driven tracks do not extend underneath the portions of the slide-out section floors that will be visible from the outside of the vehicle when the system is in its extended position, thereby presenting a clean and generally smooth appearance when viewed from the outside.

21 Claims, 7 Drawing Sheets

MULTIPLE SLIDE-OUT ROOM FOR A RECREATIONAL VEHICLE

CROSS-REFERENCE TO RELATED APPLICATIONS

Not Applicable.

BACKGROUND OF THE INVENTION

1. Field of the Invention

This invention relates to the field of bodies and tops of vehicles. More particularly, this invention relates to the field of recreational vehicles with expansible or collapsible vehicle bodies.

2. Description of Related Art

Various vehicles, such as recreational vehicles (RVs), are known to have rooms that may be expanded and retracted. U.S. Pat. No. 6,067,756 issued to Frerichs et al. shows one such room extender. An expanded position provides more internal living space for the comfort and convenience of occupants. A retracted position conforms the vehicle to street legal specifications and increases rigidity and aerodynamic performance so that the vehicle is mobile.

A vehicle may have several rooms which can be expanded with a slide-out system. Each slide-out system commonly involves a single, integrated structure which can be moved with respect to the vehicle chassis. The movable structure consists of a floor, a ceiling, side walls, and an exterior wall which are connected together. The structure is sized and dimensioned so that it can pass through an opening in an exterior wall of the vehicle, and is typically mounted and motor driven so that it may move outward into an expanded or extended position for use in that position, and inward into a retracted position for driving. U.S. Publication Nos. 2005/0184546, 2006/0125266, and 2006/0113822 all disclose slide-out drive systems that may be used with extendable bay windows within slide-out rooms.

SUMMARY OF THE INVENTION

The present invention provides a multiple telescoping slide-out system for a vehicle in which guide tracks are substantially hidden from view from outside the vehicle. A room is expanded by telescoping multiple, large room sections through an opening in the vehicle exterior.

In an illustrative embodiment, two slide-out sections move telescopically with respect to each other to define an entire room that extends outward. The first slide-out section has a floor, with a first carriage abutting the floor and attached thereto. A drive track affixed to the underside of the carriage is driven by a drive motor that is affixed to the floor of the recreational vehicle. When the drive motor is activated to drive the first slide-out section outward with respect to the recreational vehicle, the carriage abutting the first slide-out section floor pushes on the first slide-out section to push it outward relative to the recreational vehicle. Rollers affixed to the recreational vehicle near and stationary with respect to the non-moving wall of the recreational vehicle support the first slide-out section as it moves. Because the carriage abuts the floor of the first slide-out portion and the drive track affixed to the carriage remains within a volume defined by the stationary walls of the recreational vehicle, the portion of the first slide-out section that extends beyond the exterior wall of the vehicle has no drive track, gears, or other driven mechanism visible from the outside.

The second slide-out section fits within the first slide-out section and is only slightly smaller than the first slide-out section. A second carriage abuts the floor of the second slide-out section and is attached thereto. A second drive motor affixed to the first carriage drives a drive track that is affixed to the underside of a second carriage. When the second drive motor is activated to drive the second slide-out section outward with respect to the first slide-out section, the second carriage abutting the second slide-out section floor pushes on the second slide-out section to push it outward relative to the first slide-out section. Rollers affixed to the first slide-out section support the second slide-out section as it moves. Because the carriage abuts the floor of the second slide-out portion and the drive track affixed to the second slide-out portion remains within a volume defined by the walls of the first slide-out section, the portion of the second slide-out section that extends beyond the exterior wall of the first slide-out section has no drive track, gears, or other driven mechanism visible from the outside. Accordingly, the multiple extending slide-out sections, when extended in order to maximize the interior space of the recreational vehicle, can be generally smooth with no drive tracks visible from the outside of the recreational vehicle, thus presenting a clean and aesthetically appealing appearance.

Exemplary embodiments of the invention will be further described below with reference to the drawings, in which like numbers refer to like parts.

DETAILED DESCRIPTION OF THE PREFERRED EMBODIMENTS

The figures and the following description disclose one exemplary embodiment of the invention.

Figure 1:
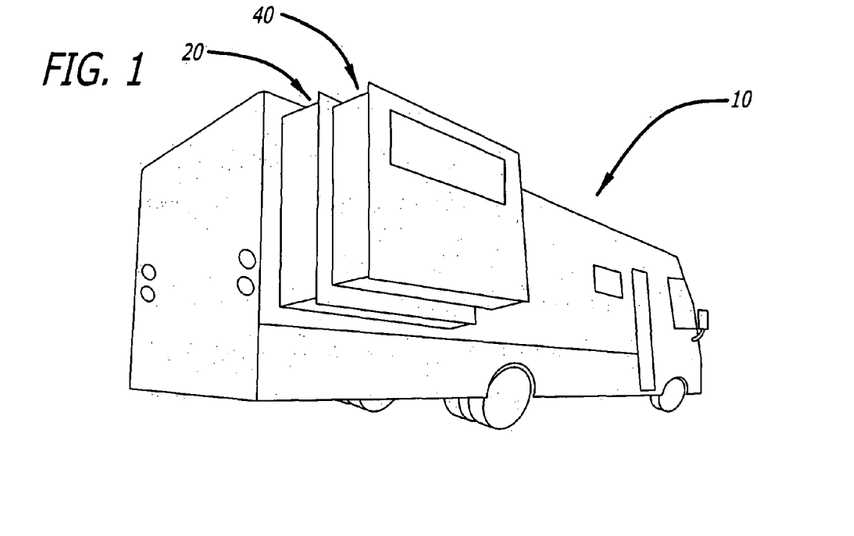
FIG. 1 is an external perspective view of a recreational vehicle equipped with the multiple slide-out system of an illustrative embodiment of the present invention.

FIG. 1 is an external perspective view of a vehicle such as a recreational vehicle 10 equipped with a multiple slide-out system according to an exemplary embodiment of the present invention. A first slide-out section 20 slides outward relative to recreational vehicle 10, and a second slide-out section 40 extends relative to first slide-out section 20. Second slide-out section 40 telescopes within first slide-out section 20 to provide substantially an entire room that extends substantially twice as far as a single slide-out room.

Figure 2:
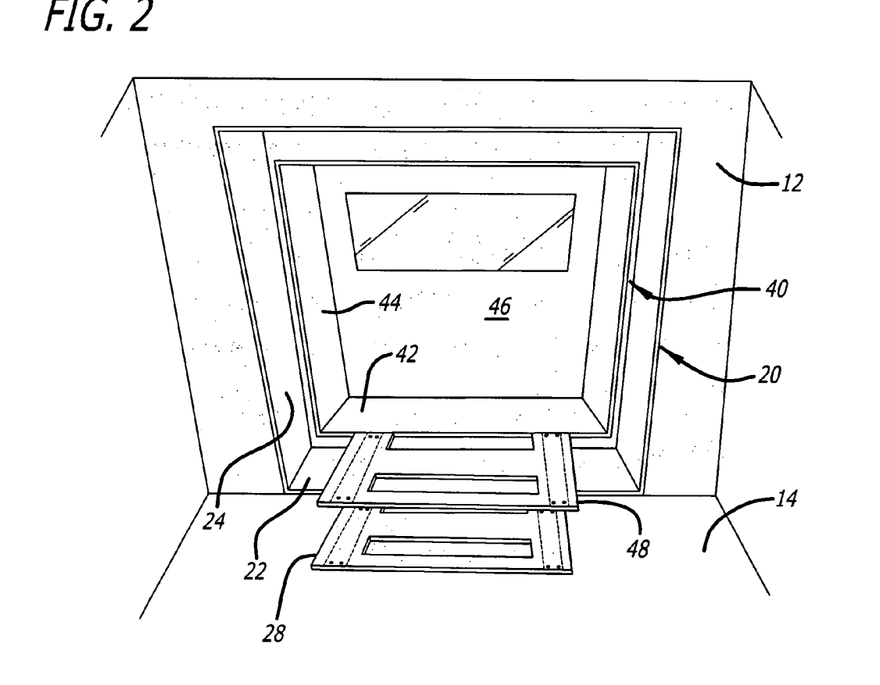
FIG. 2 is an internal perspective view of the multiple slide-out system of FIG. 1 with the system in the extended position.

FIG. 2 is an internal perspective view of the multiple slide-out system of FIG. 1 with the system in the extended position. First slide-out section 20 includes a floor 22, and at least one upwardly extending wall 24. A first carriage 28 abuts and is affixed to floor 22 in generally the same plane as floor 22. Second slide-out section 40 includes a floor 42, at least one upwardly extending wall 44, and a side wall 46 which is also an exterior wall of the vehicle. A second carriage 48 abuts and is affixed to floor 42 in generally the same plane as floor 42. In the extended position, exterior wall 46 rests significantly beyond vehicle wall 12. The drive mechanisms, which would be only slightly visible in this figure, are not shown in this figure for the sake of clarity, and will be illustrated and described later.

Figure 3:
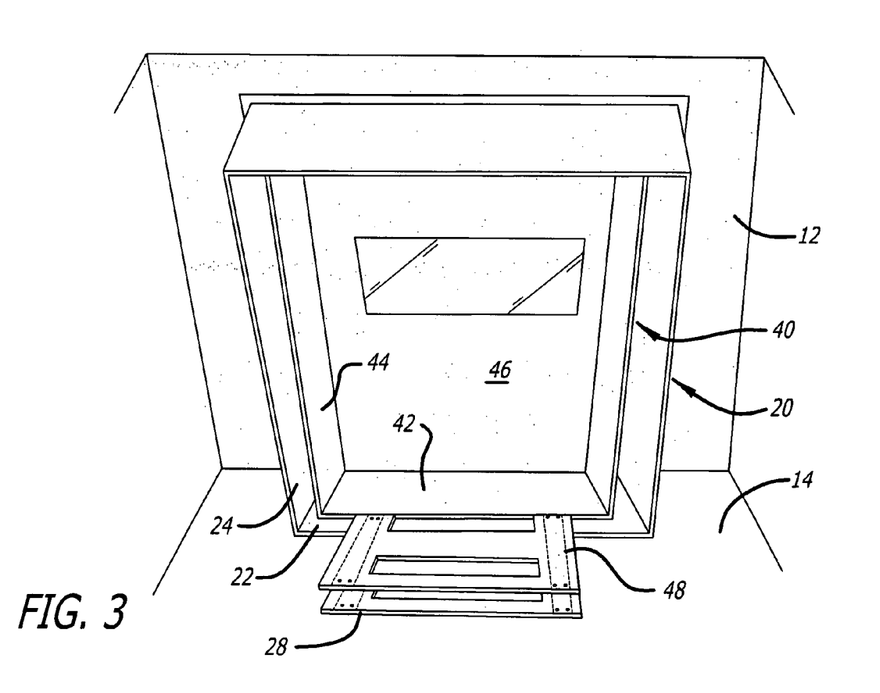
FIG. 3 is an internal perspective view of the multiple slide-out system of FIG. 1 with the system in the retracted position.

FIG. 3 is an internal perspective view of the multiple slide-out system of FIG. 1 with the system in the retracted position. In this position exterior wall 46 is substantially co-planar with vehicle wall 12. However, depending on construction details and design choices, exterior wall 46 could be slightly offset from exterior wall 12. The side wall 44 of second slide-out section 44 is substantially parallel to the side wall 24 of the first slide-out section, and is in close proximity thereto in order to maximize the internal volume of the vehicle when the slide-out system is fully extended.

Figure 4:
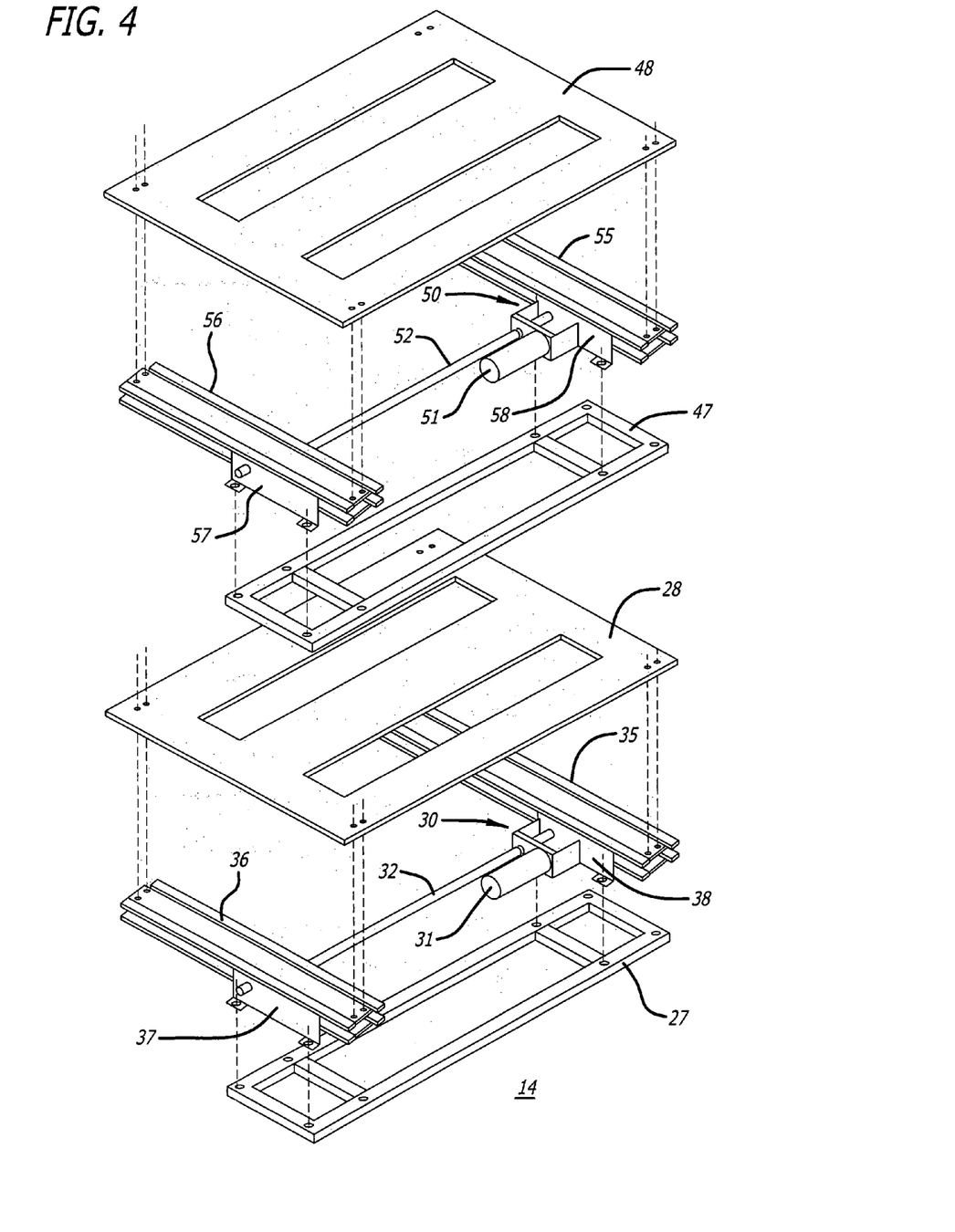
FIG. 4 is an exploded view of the mechanism of the multiple slide-out system of FIG. 1.

FIG. 4 is an exploded view of the mechanism of the multiple slide-out system of FIG. 1. A first steel frame 27 is bolted or otherwise affixed to floor 14 of recreational vehicle 10. A first drive mechanism 30 includes a first motor 31 that drives both a first cog (not shown) and a second cog 34 (FIG. 8) via an extended rotating shaft 32. Drive frames 37 and 38 are bolted or otherwise affixed to frame 27 in order to hold the cogs relative to recreational vehicle floor 14. Preferably the same bolts or other fasteners which hold frames 37 and 38 to frame 27 also hold frame 27 to floor 14. Driven tracks 35 and 36, which are each affixed to the underside of first carriage 28, are each driven by drive gears. The drive mechanism may be of the rack and pinion type, with the drive gears defining pinions and tracks 35 and 36 defining racks.

When first motor 31 is activated to extend the system, cog 33 (FIG. 8) turns thereby turning pinion 34 which in turn drives drive track 35 outward. Because drive track 35 is affixed to carriage 28, which abuts and is affixed to floor 22 of first slide-out section 20 (FIG. 2), first slide-out section 20 is driven outward.

Similarly, a second drive mechanism 50 includes a second motor 51 that drives two cogs via extended rotating shaft 52. Frames 57 and 58 are bolted or otherwise affixed to hold the cogs relative to floor 22 of first slide-out section 20. Preferably the same bolts or other fasteners which hold frames 57 and 58 to frame 47 also hold frame 47 to floor 22. Driven tracks 55 and 56, which define racks and which are each affixed to the underside of second carriage 48, are driven by respective pinions.

When second motor 51 is activated to extend the system, the cogs drive the pinions thereby driving track 56 outward. Because track 56 is affixed to carriage 48, which abuts and is affixed to floor 42 of second slide-out section 40 (FIG. 2), second slide-out section 40 is driven outward.

First carriage 28 and second carriage 48 are shown as generally flat members with two elongated cutouts formed in each carriage. The elongated cutouts serve to allow easy access to parts of the system for service and replacement in the illustrative embodiment, but it is to be understood that many different configurations for carriages 28 and 48 are possible.

When the system is in its retracted position, the two carriage sections 28 and 48 stack substantially one on top of another. Similarly, the driven tracks 35 and 36, and 55 and 56, are disposed substantially one on top of another, as are motors 31 and 51, and other corresponding parts of the two separately operable slide-out sections.

Figure 5:
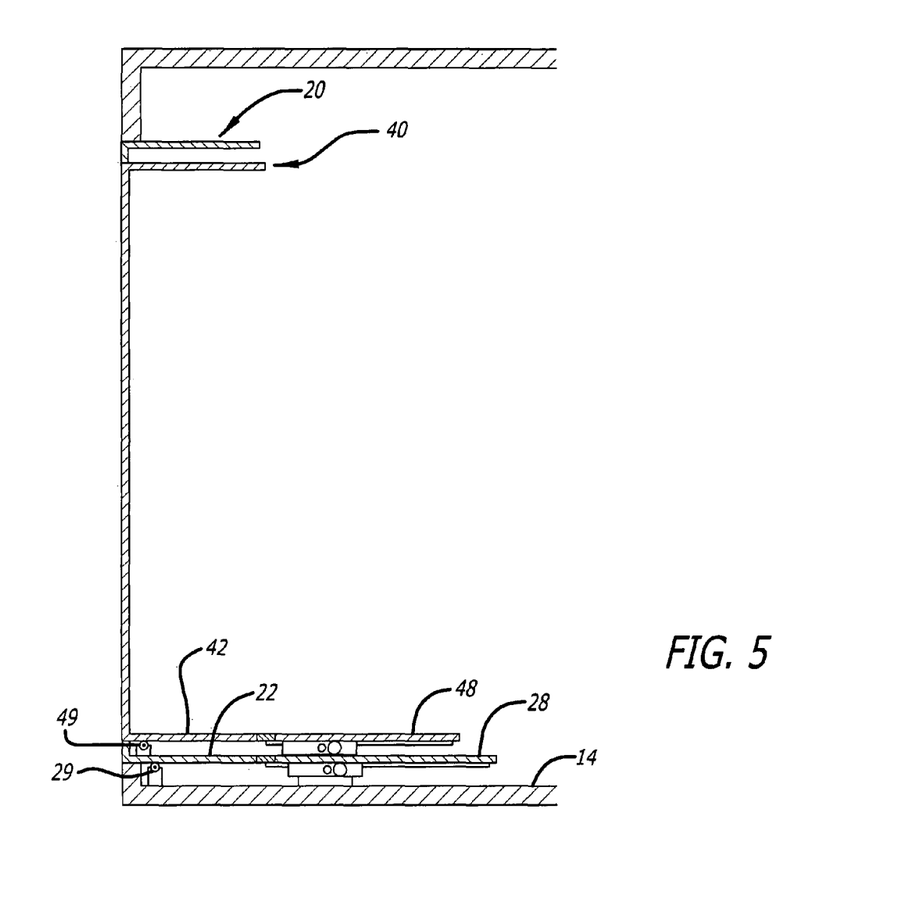
FIG. 5 is a side elevation cut-away view of the multiple slide-out system of FIG. 1 with the system in the retracted position.

FIG. 5 is a side elevation cut-away view of the multiple slide-out system of FIG. 1 with the system in the retracted position. In this position first slide-out section 20 is fully retracted into vehicle 10, and second slide-out section 40 is fully retracted into first slide-out section 20 and into vehicle 10. Floor 22 of first slide-out section 20 is connected to first carriage 28 and is supported by first roller 29 which is affixed to the top surface of the floor 14 of the vehicle. Floor 42 of second slide-out section, which is connected to second carriage 48, is supported by second roller 49 which is affixed to the top surface of floor 22 of the first slide-out section 20. First roller 29 actually comprises a pair of rollers supporting first slide-out section floor 22, with one roller being positioned nearer the front of the vehicle and the other roller being disposed nearer the back of the vehicle. Similarly, second roller 49 actually comprises a pair of rollers supporting second slide-out section floor 42, with one roller being positioned nearer the front of the vehicle and the other roller being positioned near the rear of the vehicle. Rollers 29 and 49 may be made of any suitable material, preferably a non-marking material such as urethane so as not to leave visible marks on the undersides of the slide-out section that are visible when the system is in its extended position.

As seen in the figure, first carriage 28 is generally co-planar with and at substantially the same elevation as first slide-out section floor 22, and second carriage 48 is generally co-planar with and at substantially the same elevation as second slide-out section floor 42. However, it is not necessary that those components be strictly co-planar. First carriage 28 and second carriage 48 lie in substantially parallel planes, with first carriage 28 disposed over second carriage 48 so as to be generally stacked thereon.

Details regarding how the slide-out sections 20 and 40 may fit together into the vehicle 10, including gaskets and lips, are omitted for clarity but are well known within the art of recreational vehicle design.

Figure 6:
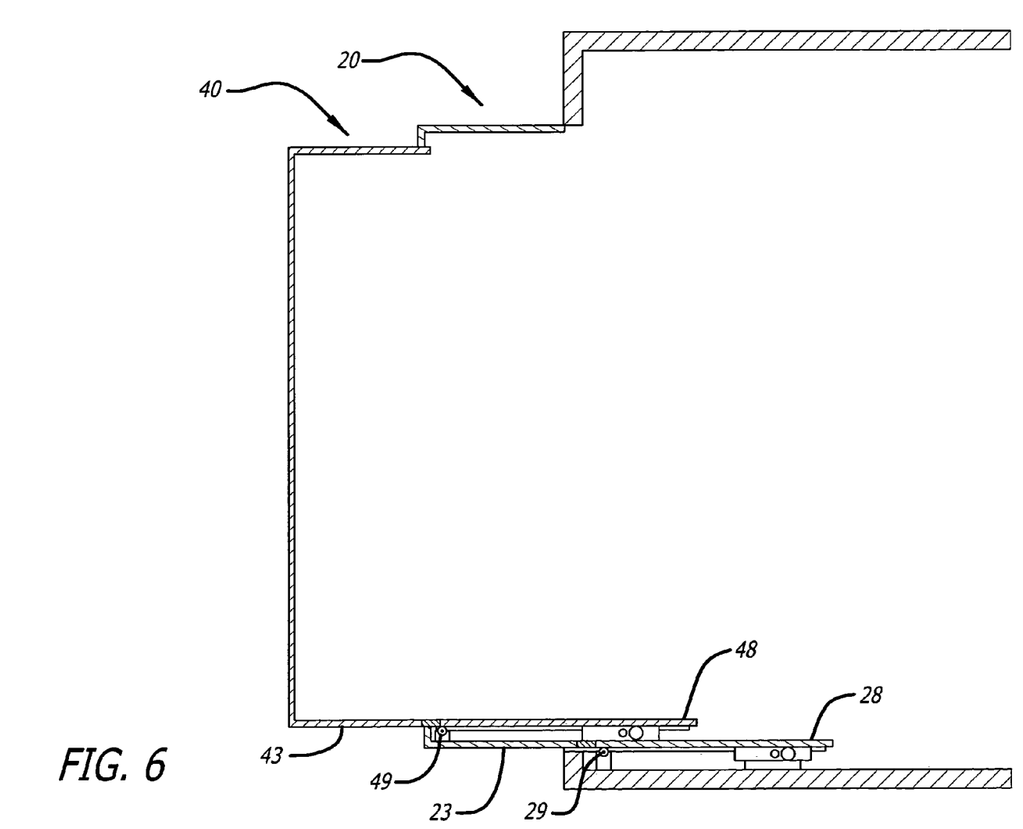
FIG. 6 is a side elevation cut-away view of the multiple slide-out system of FIG. 1 with the system in the extended position.

FIG. 6 is a side elevation cut-away view of the multiple slide-out system of FIG. 1, with the system in the extended position. The drive tracks 35 and 55 (FIG. 7) do not extend to the outside of the vehicle. Consequently, undersides 23 and 43 of the floors of first and second slide-out sections 20 and 40, respectively, may be generally smooth to the appearance from the outside of the vehicle with no unsightly or greasy drive track visible thereon.

Figure 7:
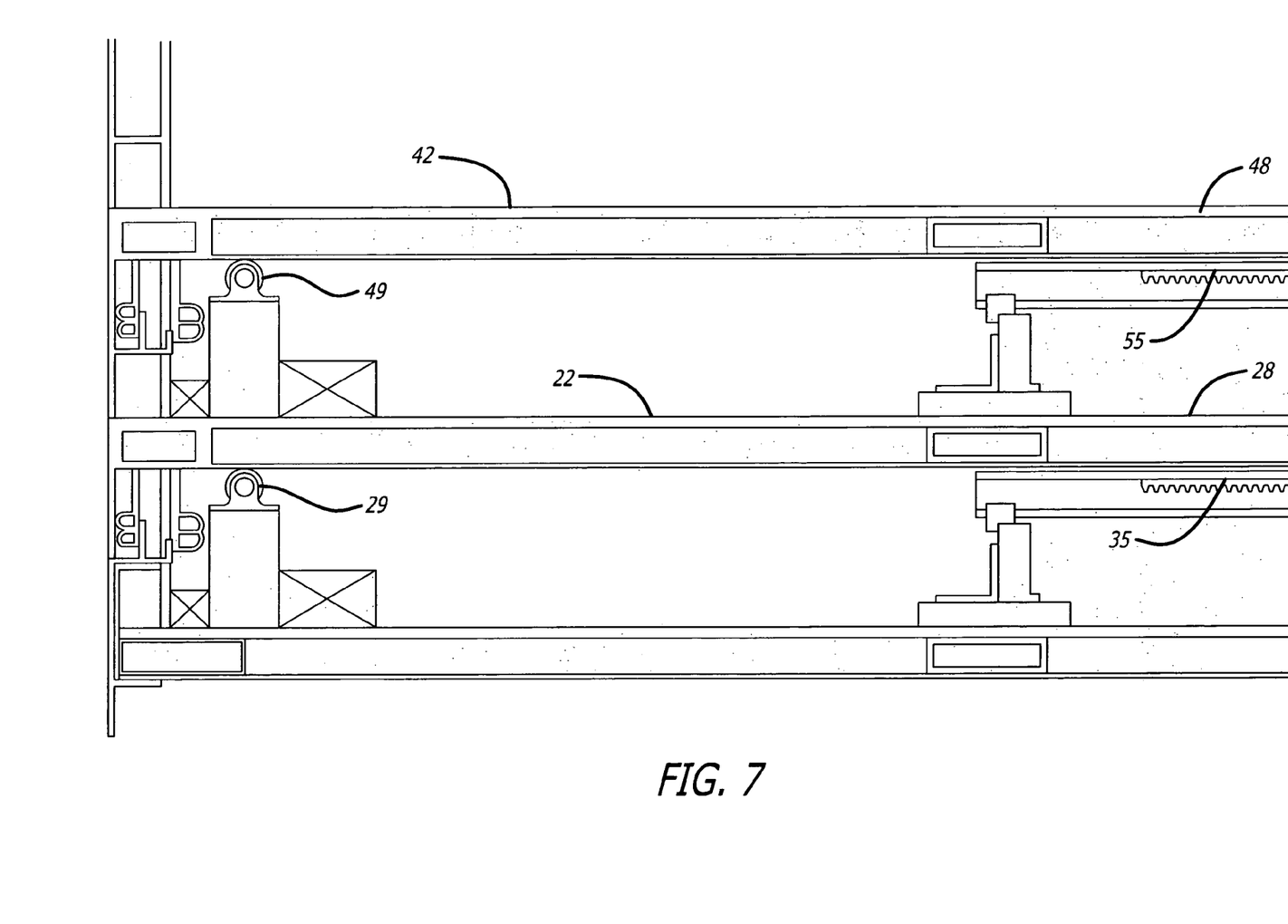
FIG. 7 is a side elevation cut-away view of the distal portion of the multiple slide-out system of FIG. 1 with the system in the retracted position.

FIG. 7 is a side elevation cut-away view of the distal portion of the multiple slide-out system of FIG. 1 with the system in the retracted position. Roller 29 supports the underside of floor 22 of the first slide-out section 20. Roller 49 supports the underside of floor 42 of the second slide-out section 40. Carriage sections 28 and 48 are connected to, and generally co-planar with, floors 22 and 42, respectively.

Figure 8:
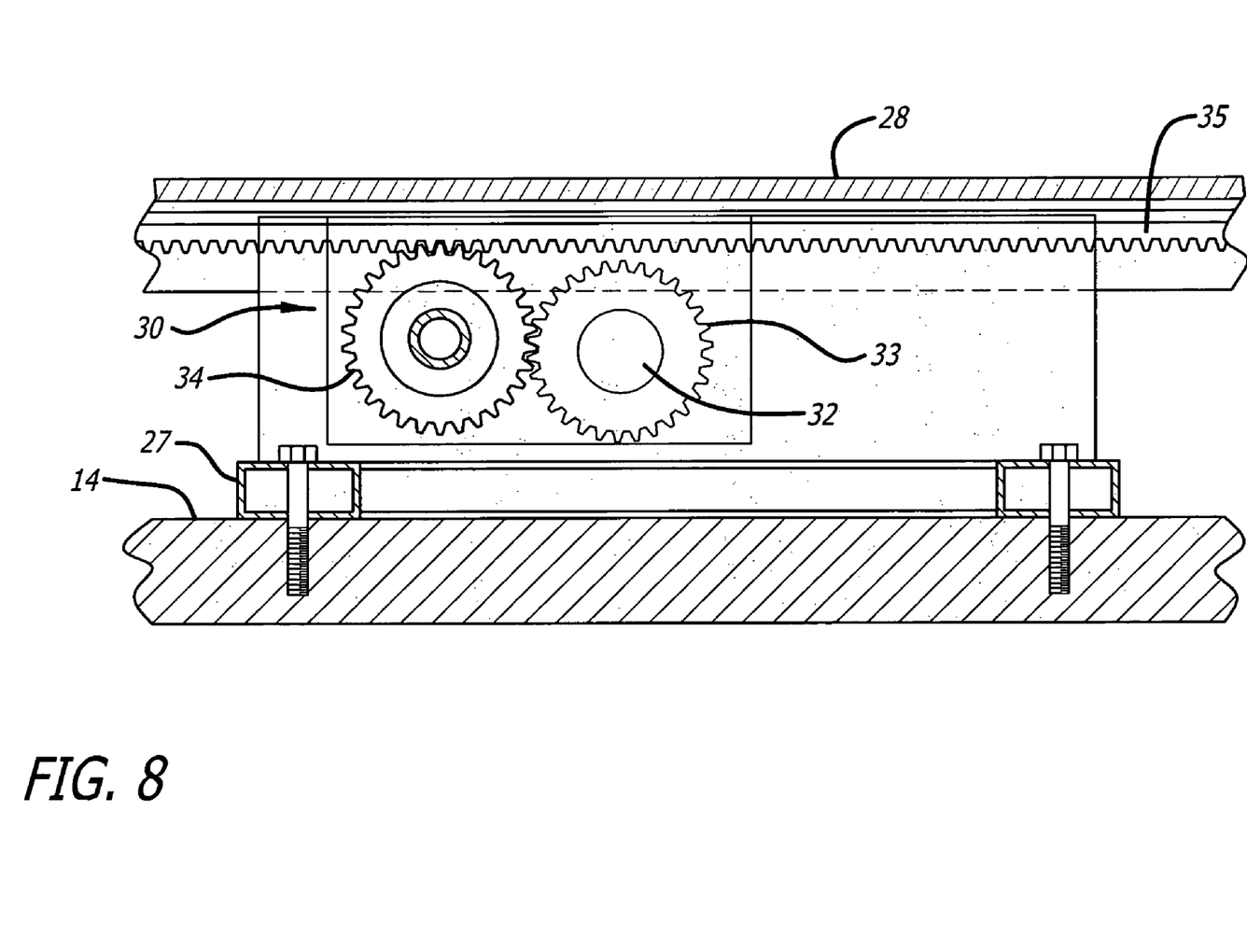
FIG. 8 is a side elevation cut-away view of one of the rack and pinion drive mechanisms of the multiple slide-out system of FIG. 1.

FIG. 8 is a side elevation cut-away view of one of the rack and pinion drive mechanisms of the multiple slide-out system of FIG. 1. Rotating drive shaft 32 with attached cog 33 drives pinion 34, thus driving track 35 and attached carriage 28 outward when the system is extending, and inward when the system is retracting.

Figure 9:
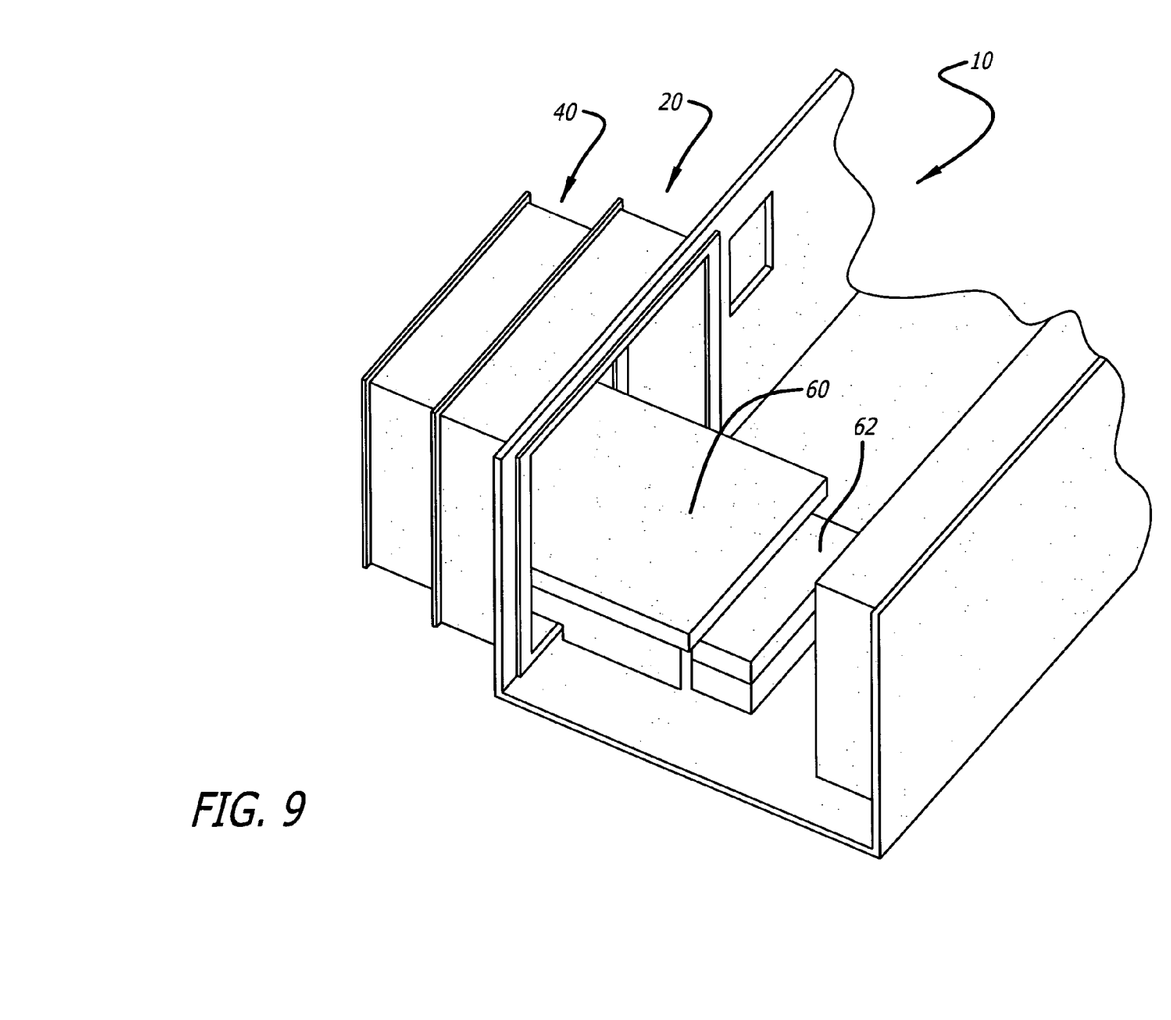
FIG. 9 a is perspective view of the multiple slide-out system of FIG. 1 with the system in the extended position and with a bed positioned above the drive mechanism.

FIG. 9 is a perspective view of the multiple slide-out system of FIG. 1 with the system in the retracted position and with bed 60 positioned above the drive mechanism, and with the head of the bed generally positioned up against exterior wall 46 and resting on floor 42. The foot of bed 60 has rollers affixed to it in order to roll over floor 14 of the vehicle as the system is being extended or retracted. In this configuration the bed disposed over the drive mechanism including carriages 28 and 48 hides the drive mechanism from view when viewed from the inside of vehicle 10. A foot bench 62 is stationary with respect to the floor of vehicle 10, and lies hidden underneath bed 60 when the slide-out system is retracted. When the slide-out system extends, bed 60 moves outward to reveal foot bench 62. With bed 60 extending over the drive mechanism, and no drive tracks visible from the outside, none of the components of the drive system is visible from either the outside or the inside of the vehicle, thus presenting a clean and aesthetically pleasing appearance both internally and externally. Although a bed is positioned over the drive mechanism in this exemplary embodiment, the present invention can be used with or without a bed.

The second slide-out system 40 has almost as great a height and width, and hence almost as great a cross sectional area, as does first slide-out system 20. Thus, the multiple slide-out system encompasses virtually an entire room that doubly extends. In a preferred embodiment, the cross sectional area defined by the walls of second slide-out system 40 is at least 75% of the cross sectional area defined by the walls of first slide-out system 20, and more preferably is at least 90% of the cross sectional area defined by the walls of first slide-out system 20.

It will be appreciated that the term "present invention" as used herein should not be construed to mean that only a single invention having a single essential element or group of elements is presented. Similarly, it will also be appreciated that the term "present invention" encompasses a number of separate innovations which can each be considered separate inventions. Although the present invention has thus been described in detail with regard to the preferred embodiments and drawings thereof, it should be apparent to those skilled in the art that various adaptations and modifications of the present invention may be accomplished without departing from the spirit and the scope of the invention. For example, different types of motors may be use, and different drive mechanisms other than rack and pinion drives are possible. Although electric motors are shown the motors could be pneumatically or hydraulically activated. The present invention may also be used with vehicles other than recreational vehicles. The carriages may have different shapes and configurations than the ones shown. Other variations are possible. Accordingly, it is to be understood that the detailed description and the accompanying drawings as set forth hereinabove are not intended to limit the breadth of the present invention, which should be inferred only from the following claims and their appropriately construed legal equivalents.

We claim:

1. A slide-out system for a vehicle comprising:
    a first drive mechanism anchored to a floor of the vehicle;
    a first slide out section including a first wall that is movable relative to an exterior wall of the vehicle, the first wall defining a floor of the first slide out section, the first wall coupled to a first driven member engaged by said first drive mechanism, the first driven member being disposed interior to the vehicle relative to the first slide-out section;
    a second drive mechanism anchored to the first wall such that the second drive mechanism is located on the floor of the first slide out section;
    a second slide-out section including a second wall that is movable relative to the first wall, the second slide-out section coupled to a second driven member engaged by said second drive mechanism, the second driven member being disposed interior to the vehicle relative to the second slide-out section;
    such that when said slide-out system is extended:
        said first slide-out section is extended relative to said vehicle exterior wall;
        said second slide-out section is extended relative to said first slide-out section and relative to said vehicle exterior wall; and
        said first and second drive mechanisms and said first and second driven members are substantially hidden from an exterior view of the vehicle.

2. The slide-out system of claim 1 wherein said first drive mechanism and said second drive mechanism each comprise:
    a motor;
    an extended rotating shaft anchored to said motor;
    two cogs anchored to said motor, at least one of said cogs being driven by said extended rotating shaft.

3. A slide-out system for a recreational vehicle comprising:
    a first frame slideably disposed within a recreational vehicle, said first frame comprising at least a first movable wall, the first movable wall being coupled to a first driven track, said first frame including a first floor;
    a second frame slidably disposed within an interior of said first frame, the second frame comprising at least a second movable wall, the second movable wall being coupled to a second driven track, said second frame including a second floor;
    a first motor driving said first driven track to slide the first frame outward relative to the recreational vehicle;
    a second motor anchored to said first movable wall and driving said second driven track to slide the second frame outward relative to said first frame;
    wherein, when the two frames are moved to respective extended positions, the first driven track remains within a volume defined by stationary walls of said recreational vehicle, the second driven track remains within a volume defined by said stationary walls of said recreational vehicle and said first frame, and said first and second frames cooperate to define substantially an entire room of said recreational vehicle with said first and second floors of said first and second frames cooperating to define a floor of said room.

4. The slide-out system of claim 3 further comprising:
    a bed disposed over said first and second motors and over said first and second driven tracks.

5. The slide-out system of claim 4 wherein said bed extends into a first interior space defined by said first frame, and into a second interior space defined by said second frame.

6. The slide-out system of claim 3 wherein said first motor, first driven track, second motor and second driven track are substantially hidden underneath a bed from a vehicle occupant's view.

7. The slide-out system of claim 3 further comprising:
    a first roller mounted near an exterior wall of said recreational vehicle for rollably supporting said first frame as said first frame moves relative to the recreational vehicle; and
    a second roller mounted within said first frame for rollably supporting said second frame as said second frame moves relative to the first frame.

8. The slide-out system of claim 3 wherein said first motor is coupled to a first pinion, and said second motor is coupled to a second pinion.

9. The multiple slide-out section of claim 3 wherein said second slide-out section has a cross sectional area of at least 90% of the cross sectional area of the first slide-out section.

10. The slide-out system of claim 3 wherein:
said first driven track is affixed to and underneath a first planar member that is disposed generally planar with a bottom wall of said first frame and is connected thereto;
said second driven track is affixed to and underneath a second planar member that is disposed generally planar with a bottom wall of said second frame and is connected thereto.

11. A multiple slide-out section of a vehicle, comprising:
a first slide-out section comprising:
   a first floor having a bottom surface and an upper surface;
   a first carriage attached to and abutting said first floor;
   a first roller attached to said upper surface of said first floor;
a second slide-out section comprising:
   a second floor having a bottom surface and an upper surface;
   a second carriage attached to and abutting said second floor;
said second slide-out section retractable within said first slide-out section, and said bottom surface of said second floor resting directly upon said first roller;
a vehicle floor having a second and fixed roller anchored thereto; and
said first slide-out section retractable within an opening within said vehicle;
wherein said bottom surface of said first floor rests directly upon said fixed roller.

12. The multiple slide-out section of claim 11, wherein said second floor bottom surface is generally smooth.

13. The multiple slide-out section of claim 11, wherein said second floor bottom is substantially in the same plane as said first carriage.

14. The multiple slide-out section of claim 11, wherein no track is visible from viewing the vehicle from an exterior thereof when said second slide-out section is extended.

15. The multiple slide-out section of claim 11, wherein said second carriage stacks above said first carriage when said first and second slide-out sections are retracted into said vehicle.

16. The multiple slide-out section of claim 11, wherein said first and second carriages have first and second driven tracks attached to undersides thereof, respectively, said first and second driven tracks being driven by first and second motors, respectively.

17. The multiple slide-out section of claim 16, wherein said first and second carriages each have at least one elongated hole formed therein through which said first and second motors may be accessed by a service person.

18. The multiple slide-out section of claim 11, wherein said first floor and said second floor form the floor of a first room section and second room section, respectively, each room section comprising at least one wall anchored to said respective floor;
wherein the second room section is sized such that it retracts within and substantially fills said first room section.

19. An expandable room system for a vehicle comprising:
a first motor driving a first driven track attached to an underside of a first member, said first member located inward of a floor of a first moving expandable room section relative to said vehicle such that said first member pushes said floor of said first moving expandable room section outward relative to said vehicle;
a second motor anchored to said first member, said second motor driving a second driven track attached to an underside of a second member that pushes a second moving expandable room section outward relative to said vehicle.

20. The expandable room system of claim 19 wherein when said expandable room system is in a refracted position, said first driven track and said second driven track are disposed substantially one on top of another.

21. The expandable room system of claim 19 wherein said second motor drives said second driven track independently of said first driven track.

* * * * *